US012584063B2

(12) United States Patent
Germino Ferreira Da Silva et al.

(10) Patent No.: US 12,584,063 B2
(45) Date of Patent: Mar. 24, 2026

(54) METHOD OF ACIDIFICATION, INHIBITION AND DAMAGE REMOVAL FOR WELLS

(71) Applicant: Petróleo Brasileiro S.A.—Petrobras, Rio de Janeiro (BR)

(72) Inventors: Mario Germino Ferreira Da Silva, Rio de Janeiro (BR); Valtair Marcos Cristante, Rio de Janeiro (BR); Fernanda Rodrigues Guimaraes, Rio de Janeiro (BR); Fernando Antonio Moreira Da Silva, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 559 days.

(21) Appl. No.: 18/081,870

(22) Filed: Dec. 15, 2022

(65) Prior Publication Data

US 2023/0193118 A1 Jun. 22, 2023

(30) Foreign Application Priority Data

Dec. 16, 2021 (BR) ...................... 10 2021 025515 3

(51) Int. Cl.
C09K 8/72 (2006.01)
C09K 8/528 (2006.01)
(52) U.S. Cl.
CPC ................ C09K 8/72 (2013.01); C09K 8/528 (2013.01)
(58) Field of Classification Search
None
See application file for complete search history.

(56) References Cited

U.S. PATENT DOCUMENTS

| | | | | |
|---|---|---|---|---|
| 7,464,754 B1 * | 12/2008 | Decker | .................. | E21B 43/26 166/263 |
| 11,781,061 B2 * | 10/2023 | Quraishi | ................. | C23F 11/04 166/307 |
| 11,795,380 B2 * | 10/2023 | Quraishi | ................. | E21B 41/02 |
| 2020/0369951 A1 * | 11/2020 | Quraishi | ................. | E21B 43/26 |

FOREIGN PATENT DOCUMENTS

| | | | | |
|---|---|---|---|---|
| BR | 102019025415 A2 | 6/2021 | | |
| BR | 102019028273 A2 | 7/2021 | | |
| GB | 2439076 A * | 12/2007 | ............. | E21B 43/20 |

OTHER PUBLICATIONS (2016) ScaleMAT Acid-compatible Scale Inhibitor, Schlumberger, 1 page.
Smith et al. (Jan. 30, 2001) "Field Experiences with a Combined Acid Stimulation and Scale Inhibition Treatment", Society of Petroleum Engineers (SPE-68312-MS), 4 pages.

* cited by examiner

*Primary Examiner* — John J Figueroa
(74) *Attorney, Agent, or Firm* — Morrison & Foerster LLP

(57) ABSTRACT

The invention addresses to a method of applying a formulation obtained from a mixture of phosphonic salts and acids $(R1—P(OR2)(OR3))$, sulfonic acids $(R—SO_3H)$ and/or carboxylic acids $(R—COOH)$. The pH of this formulation must be less than 3.5, preferably between 2.0 and 3.5. The formulation can be manufactured by dilution in saline fluid at the WSSV facility, in product compatible tanks on the rig or offshore platform or stimulation boat. This formulation enables acid stimulation and inhibition of the well in the same operation, in addition to removing damage caused by the use of organic acids in carbonate oil and natural gas reservoirs.

9 Claims, No Drawings

METHOD OF ACIDIFICATION, INHIBITION AND DAMAGE REMOVAL FOR WELLS

CROSS-REFERENCE TO RELATED APPLICATION

This application claims priority to Brazilian Application No. 10 2021 025515 3 filed on Dec. 16, 2021, and entitled "METHOD OF ACIDIFICATION, INHIBITION AND DAMAGE REMOVAL FOR WELLS," the disclosure of which is incorporated herein by reference in its entirety.

FIELD OF THE INVENTION

The present invention is related to the production development field in the management of carbonate reservoirs, associated with the control of production losses through production management, in the guarantee of production flow, more specifically with the acidification of wells and scaling inhibition carried out simultaneously.

DESCRIPTION OF THE STATE OF THE ART

The technical problem that motivated the invention was the need of stimulating carbonate reservoirs to remove damage caused by the well drilling process, where the drill, when cutting carbonate rocks, causes grinding on the rock surface, generating debris, which when entering the natural porosity, cause damage to the formation, with a reduction in the effective permeability. This damage is usually removed by acid stimulation by applying hydrochloric, acetic, or formic acids and mixtures of these acids. However, the analysis of damage in acid stimulation operations in wells in the Búzios field, disclosed an acceleration in the return of damage to selective completion, attributable to the use of organic acids, which can generate residues due to incomplete solubilization or because they generate a residual aqueous fluid of high alkalinity (increase of the carbonate precipitation potential). In addition, for the acidification or inhibition operations of a well, different operations were required.

The document by SMITH and other authors (SMITH, P. S. et al. Field Experiences with a Combined Acid Stimulation and Scale Inhibition Treatment. International Symposium on Oilfield Scale, Aberdeen, United Kingdom, January 2001. Paper Number: SPE-68312-MS) evaluates the combination of acid stimulation chemicals and scale inhibitors. This document also presents results of an acid compatible scale inhibitor compared to conventional treatment. FIG. 1 of the mentioned document presents the results of using the acid scale inhibitor combined with acid stimulation in relation to the conventional treatment (HCl/HF). Although this document presents the use of the acid scale inhibitor, the formula of the product used or any information that would allow a technician skilled on the subject to reproduce the result was not disclosed. Therefore, this publication does not inform which scale inhibitor was used.

The document available on the internet regarding an acid-compatible scale inhibitor known as ScaleMAT discloses the use of a product capable of performing acid stimulation and scale removal (Schlumberger. Scale-MATAcid-compatible Scale Inhibitor. 2016. Available on the internet at: https://www.slb.com/completions/stimulation/acidizing-services/scalemat-scale-inhibitor. File consulted on Dec. 2, 2021). However, the formula of the product is not disclosed. Thus, a technician skilled on the subject would not be able to repeat the results of this publication.

FIG. 2 of this document shows the action of ScaleMAT. According to the document, the technology offers an acid stimulation and scale inhibition package, where the scale inhibitor remains in the reservoir and the acid is expelled, as shown in FIG. 2. The ScaleMAT would be efficient in sulfate and carbonate scales.

Document BR 10 2019 02541-5 teaches a combined treatment for removal and inhibition of scale in reservoir rock (inhibition squeeze), using inhibitors derived from organophosphonic acid, in an acid medium, in order to minimize intervention time in operations of scale mitigation in wells, in addition to reducing treatment costs and risks associated with the process.

Document BR 10 2019 028273-8 discloses a joint application process of two treatments: scale removal and inhibitor squeeze injection. Through simultaneous positioning inside the reservoir, it can be applied in scale removal operations for carbonate formations, such as in the pre-salt case, being, thus, a way to improve the efficiency of reservoir management, through an innovation in the scaling management process. Document BR 10 2019 028273-8 discloses the use of phosphonic acids, with the general formula $RP(O)(OH)_2$, preferably acetic acid, formic acid and hydrochloric acid.

In view of the difficulties present in the above-mentioned state of the art, and in order to seek solutions for the damage caused in the well drilling process and also due to the problem of return of damage caused by the use of organic acids, which can generate residues due to the incomplete solubilization or by generating a residual aqueous fluid of high alkalinity (increase in the potential for carbonate precipitation). In addition, for the acidification or inhibition operations of a well, different operations were required, which increased the costs of the business. In this way, there arises the need of developing a technology capable of performing effectively and that is in accordance with environmental and safety guidelines. The state of the art mentioned above does not have the unique features that will be presented in detail below.

OBJECTIVE OF THE INVENTION

It is a first objective of this invention to promote a treatment of damage caused by the use of organic acids in carbonate reservoirs.

It is a second objective of the invention to remove residues due to incomplete solubilization or because they generate residual aqueous fluid of high alkalinity, which causes precipitation of carbonates.

It is a third objective of the invention to allow treatments for acidification or inhibition operations of a well to be conducted in the same operation, to reduce the costs of oil and gas production activities in carbonate reservoirs.

BRIEF DESCRIPTION OF THE INVENTION

The used product is a formulation obtained from a mixture of salts and phosphonic acids (R1-P(OR 2)(OR3)), sulfonic acids ($R$—$SO_3H$) and/or carboxylic acids ($R$—$COOH$). The pH of this formulation must be less than 3.5, preferably between 2.0 and 3.5. The formulation can be manufactured by dilution in saline fluid in the WSSV (Well Service and Stimulation Vessel) facility, in tanks compatible with the product on the rig or offshore platform or stimulation boat. This formulation enables acid stimulation and inhibition of the well in the same operation, in addition to removing damage caused by the use of organic acids in carbonate reservoirs.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

The acid inhibitor product used is a formulation obtained from a mixture of salts (sodium or potassium) of phosphonic acids (R1—P(OR2)(OR3)), sulfonic acids (R—SO₃H) and/or carboxylic acids (R—COOH).

The phosphonic acids are selected from groups R1, R2 and R3 (alkylene radical, amino carboxylate, sulfonate and polycarboxylate) and their sodium or potassium salts.

The sulfonic acids are selected from the R group (alkylene radical, or polycarboxylate) and their sodium or potassium salts.

The carboxylic acids are selected from the R group, where R can be: acrylic acid derivatives, amino carboxylates, derivative polymers (polyacrylate, polymaleate) of carboxylic acids and their sodium and potassium salts.

The pH of the formulation to be used in the well of the carbonate reservoir must be less than 3.5, preferably in the range between 2.0 to 3.5.

The solution of this product can be manufactured by dilution in saline fluid (inorganic chloride solution) at the WSSV facility, in tanks compatible with the product on the rig or offshore platform. This formulation enables acid stimulation and inhibition of the well in the same operation, in addition to removing damage caused by the use of organic acids in carbonate reservoirs.

The volume of product to be used is calculated according to the radius of invasion required to remove damage and the performance time is evaluated in laboratory tests (test for dissolution of the damaging material). The concentration of the acid inhibitor product solution is in the range of 10 to 20% by volume.

The method comprises the following steps:

1. Calculating the volume of formulation to be used as a function of the radius of invasion required to remove damage;
2. calculating the formulation application time through laboratory tests (maximum contact time with the reservoir rock);
3. coupling the tank with the acid inhibitor product to the dilution tank;
4. transferring the product to the preparation tank;
5. diluting with saline fluid or industrial water;
6. applying the formulation for injection into wells.

The selected products, phosphonic acid and its salts, sulfonic acid and/or carboxylic acid, are transferred and diluted in tanks made of a material compatible with its formulation, such as stainless steel. Then, industrial water or saline fluid is pumped up to the recommended dilution (10 to 20% in volume) and, through the pumping system of the SPU or the rig, the formulation is injected into the production well of the carbonate reservoir.

In another embodiment of the invention, a pumping skid system with batch-mix (mixer tank) is used, in case the formulation is incompatible with tank materials for the preparation of the dilution, and the formulation is injected directly into the stream of saline fluid or industrial water performing a dilution by the on-the-fly method (direct injection in a flow line).

Example

As an example of the result obtained by the method of acidification, inhibition and damage removal for wells, in order to mitigate the problem of damage after acidification operations for the removal of scales, there were tested in two wells in the Búzios field the acidifications followed by the inhibitions, where there was observed an increase in the time intervals required for the next removal to maintain the productivity of the wells, without the occurrence of damage much greater than that observed when only acetic acid was pumped into the well, including helping to maintain integrity of selective completion.

In this way, for the acidification or inhibition of a well, different operations were required. The solution achieved by the present invention allows the use of a chemical formulation capable of acting in the removal of calcium carbonate as well as in the inhibition by squeeze, thus reducing the use of critical resources and reducing the time required for the well to stop production. The method can be used in acid stimulations as a substitute for organic acids that leave harmful residues, in addition to preventively acting in the inhibition of scale even in the completion phase of the well.

The technology is versatile, as it can be applied in the area of reservoirs, in the management of reservoirs, in the area of elevation and drainage, in guaranteeing the maintenance of well production through the management of scales, in the area of wells in operations in the completion of wells in acidification operations with a stimulation boat. The technology can now be fully applied to stimulate wells in carbonate reservoirs, such as those in the pre-salt. It is worth to highlight that the formulation application method allows the acidification or inhibition operations of a well to be conducted in the same operation.

The invention claimed is:

1. A method of acidification, inhibition, and damage removal for wells, wherein the method comprises:
   a) calculating a volume of formulation to be used as a function of a radius of invasion required to remove damage;
   b) calculating a formulation application time through laboratory tests;
   c) coupling a tank with an acid inhibitor product to a dilution tank;
   d) transferring a product to a preparation tank;
   e) diluting with saline fluid or industrial water; and
   f) applying the formulation for injection into wells of oil and natural gas reservoirs of a carbonate type.

2. The method of claim 1, wherein the method uses an acid inhibitor product derived from phosphonic, sulfonic, or carboxylic acids.

3. The method of claim 1, wherein the method incorporates sodium or potassium salts of compounds comprising the acid inhibitor product.

4. The method of claim 1, wherein a pH of the formulation is in the range of 2.0 to 3.5.

5. The method of claim 1, wherein manufacture of the formulation is carried out in a WSSV facility, in stainless steel tanks on a rig, or offshore platform or stimulation boat.

6. The method of claim 1, wherein a concentration of the acid inhibitor product in dilution is between 10 and 20% by volume.

7. The method of claim 1, wherein manufacture of the formulation is carried out in a pumping skid system with batch-mix, wherein the formulation is injected directly into the saline fluid or industrial water, performing a dilution by an on-the-fly method.

8. The method of claim 1, wherein the carbonate type is a pre-salt carbonate type.

9. The method of claim 1, wherein the laboratory tests measure a maximum contact time with reservoir rock.

\* \* \* \* \*